Patented Oct. 19, 1937

2,096,688

UNITED STATES PATENT OFFICE

2,096,688
VAT DYESTUFFS OF THE ANTHRAQUINONE SERIES AND PROCESS OF MAKING SAME

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Original application August 7, 1933, Serial No. 684,116. Divided and this application October 1, 1934, Serial No. 746,472. In Great Britain December 29, 1932

3 Claims. (Cl. 260—46)

The present application is a division of our application Serial No. 684,116, filed August 7, 1933, and relating to new vat dyestuffs of the anthraquinone series and a process of making same.

Our invention relates to new vat dyestuffs of the anthraquinone series and a process of making same.

U. S. Patent No. 1,990,841, issued Feb. 12, 1935 to Heinz Scheyer, describes the manufacture of vat dyestuffs by treating glyoxal-dianthraquinone compounds with an acid condensing agent such as aluminium chloride with or without previously converting them into alkali-condensed products.

In accordance with U. S. Patent No. 2,042,683, issued June 2, 1936, new vat dyestuffs are obtained by reacting on halogenated derivatives of the said condensation products corresponding probably to the general formula:

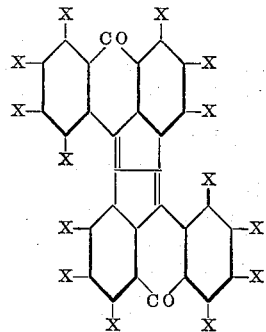

in which one or more radicles signified by X are halogen, with such nitrogeneous compounds as contain in the molecule one or more replaceable hydrogen atoms attached to nitrogen.

The dyestuffs thus obtained dye cotton from the vat more dark and covered brown shades which are often particularly desirable. The new dyetuffs have a strong tinctorial power and good fastness properties. Particularly valuable are those dyestuffs which contain as nitrogeneous groups radicles of aminoanthraquinone compounds.

In order to improve the tinctorial properties thereof according to our present process they are further treated with one of the various customary condensing agents such as chlorosulfonic acid or aluminium or iron chloride—with or without the addition of diluents—, concentrated sulfuric acid or caustic alkalies. Probably by this means a new intramolecular ring closure occurs with the formation of carbazole derivatives in a similar manner to that described in literature, using anthrimides of the anthraquinone series. By this aftertreatment the dyestuffs show a more yellowish shade and a better fastness. They dissolve in concentrated sulfuric acid mostly with a blue coloration which is unchanged by the addition of paraformaldehyde.

In order to further illustrate our invention the following examples are given, the parts being by weight and all temperatures in centigrade degrees; but we wish it, however, to be understood that our invention is not limited to the particular conditions mentioned therein:—

Example 1

48 parts of the brown condensation product obtained by subjecting the condensation product derived from 1-chloro-anthrone and glyoxal to the action of manganese dioxide in a sulfuric acid monohydrate or slightly fuming acid solution are condensed with 50 parts of 1-aminoanthraquinone in the presence of 20 parts of potash, 5 parts of copper oxide and 500 parts of naphthalene, by heating the mixture for eight hours to about 200° to 210° C.

In order to convert the dyestuff thus formed, which dyes cotton dark brown shades, into the corresponding carbazolic derivatives one may proceed as follows:—

10 parts of the dyestuff are added into 100 parts of molten caustic potash at about 180° C. and during about half an hour the temperature is raised to about 230° C. After cooling down the reaction mass is extracted with boiling water and the precipitate is filtered off. The formed dyestuff of the probable formula:

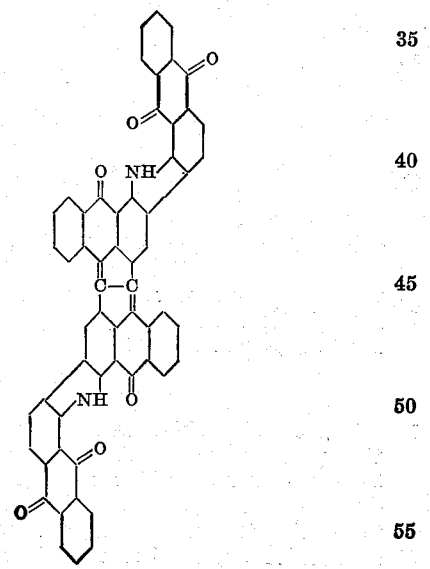

represents when dry a dark brown product dissolving in sulfuric acid with a dull reddish violet color and dyeing cotton from a brown hydrosulfite vat dull yellowish brown shades.

*Example 2*

The dyestuff formed by condensing the starting material mentioned in Example 1 with 1-amino-5-benzoylamino-anthraquinone and dyeing cotton dark brown shades, may be further treated as follows: 10 parts thereof are dissolved in about 250 parts of chlorosulfonic acid, the solution is stirred at room temperature for about 12 hours and then poured on ice. The separated dyestuff dissolves in concentrated sulfuric acid with a pure blue color which is unchanged by the addition of formaldehyde. The new dyestuff of the probable formula:

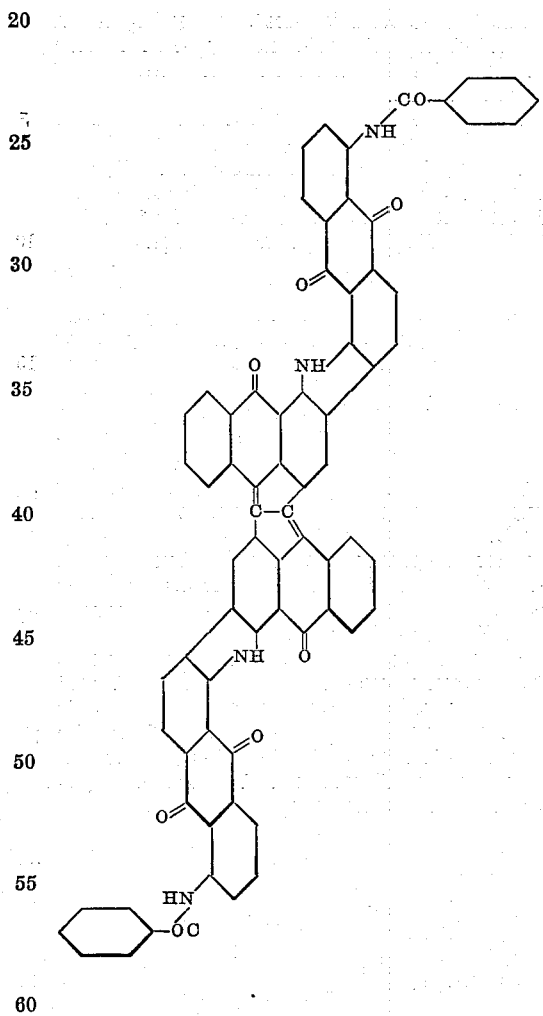

dyes cotton from a brownish red vat strong dark brown shades surpassing those of the dyestuff which has not been aftertreated with chlorosulfonic acid from the point of view of purity and fastness to chlorine.

*Example 3*

The dyestuff obtained by condensing the initial product of the foregoing examples with 1-amino-4-benzoylaminoanthraquinone which dyestuff dyes cotton chocolate like brown shades is aftertreated with about the twenty-five fold amount of chlorosulfonic acid at about 50° C. for about 4 hours. A dark dyestuff is thus obtained dissolving in sulfuric acid with a dichroic bluish red like purple color. The dyestuff of the probable formula

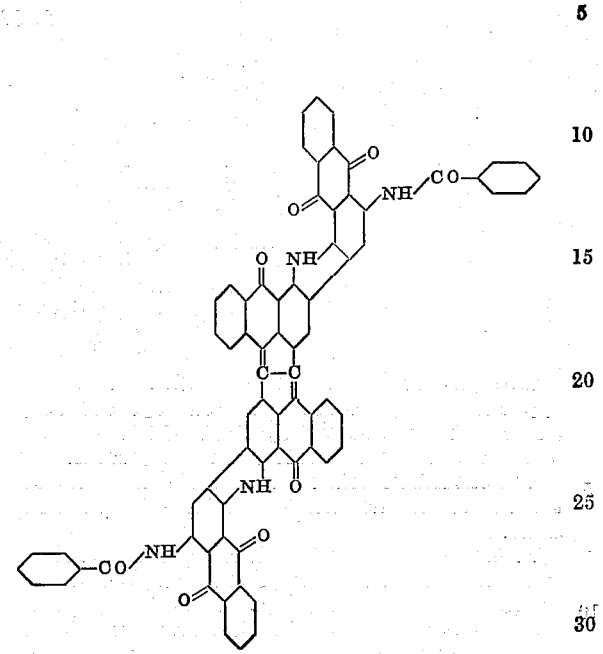

dyes cotton from a reddish violet hydrosulfite vat dark brown shades being more yellowish and essentially purer than those of the dyestuff without aftertreatment.

When condensing the glyoxal-dianthraquinone-compound derived from 2-chloroanthrone with 1-amino-4-benzoylamino-anthraquinone as described above the formed dyestuff dyes cotton reddish grey shades.

When subjecting 10 parts of this dyestuff to a melt of about 400 parts of aluminium chloride and about 100 parts of common salt at about 150° for half an hour and decomposing the reaction mass with water and hydrochloric acid a dark brown dyestuff is obtained which dyes cotton from a reddish brown hydrosulfite vat current like shades. The dyestuff dissolves in concentrated sulfuric acid with a bluish green color which is unchanged after the addition of paraformaldehyde.

*Example 4*

A starting material derived from 4-chloroanthrone may be prepared as follows: 10 parts of the condensation product from glyoxalsulfate and 4-chloroanthrone are converted according to Example 2 of U. S. Patent No. 1,990,841, issued Feb. 12, 1935 to Heinz Scheyer, by oxidation with 12 parts of potassium-persulfate in the presence of 200 parts of sulfuric acid monohydrate into the corresponding reddish brown vat dyestuff. 8 parts thereof are condensed with 8 parts of 1-aminoanthraquinone. The dyestuff thus formed dyes cotton dark reddish brown shades.

When aftertreating the dyestuff with the twenty fold amount of chlorosulfonic acid at about 50° C. for about 6 hours a dark brown powder is obtained, dissolving in sulfuric acid with a pure blue color which is unchanged after the addition of paraformaldehyde. The new dyestuff of the probable formula:

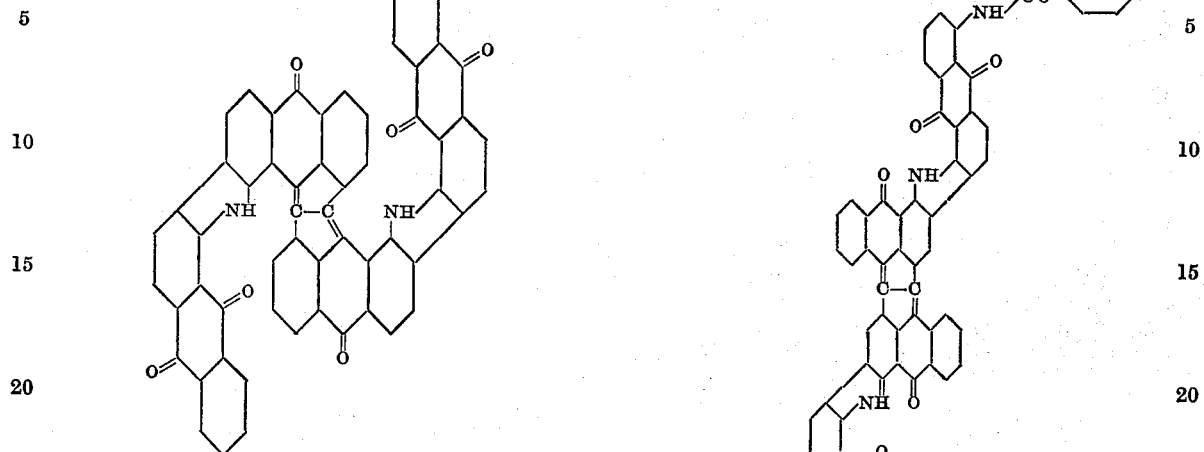

dyes cotton from a reddish brown vat yellowish dark brown shades of an excellent fastness.

We claim:—

1. Vat dyestuffs of the anthraquinone series corresponding to the general formula:

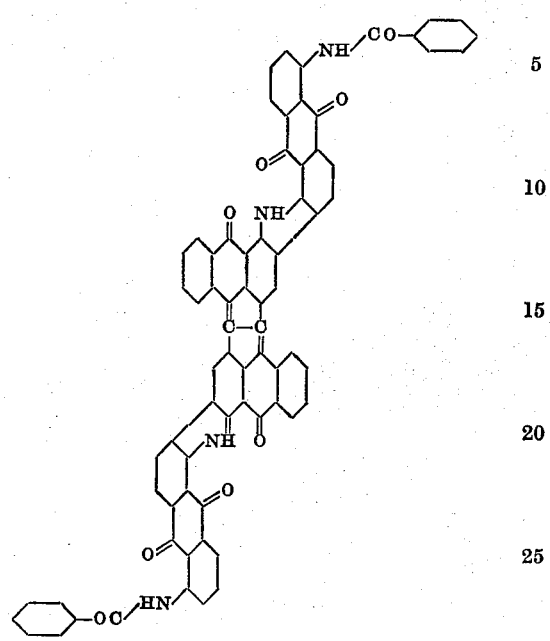

wherein the Z's stand for a member of the group consisting of hydrogen and benzoylamino radicles, but not more than one pair of the latter being present, and they always in symmetrical positions, which dyestuffs dye cotton from the vat strong brownish shades of a good fastness.

2. The vat dyestuff of the anthraquinone series of the formula:

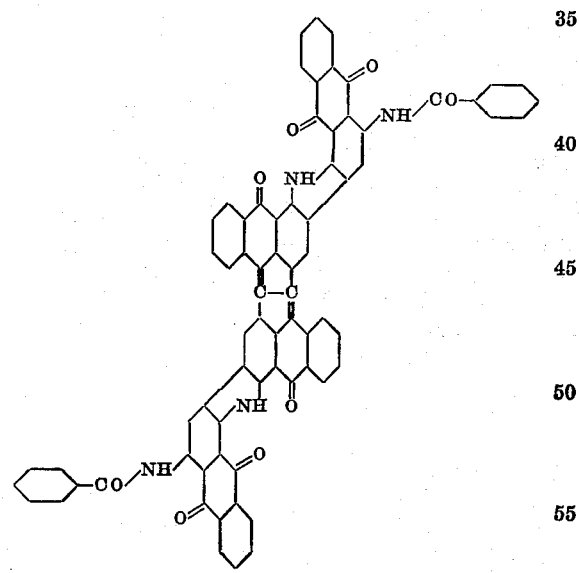

which dyestuff dyes cotton from a brownish red vat strong dark brown shades of an excellent purity and fastness particularly to chlorine.

3. The vat dyestuff of the anthraquinone series of the formula:

which dyestuff dissolves in sulfuric acid with a dichroic bluish red like purple color and dyes cotton from a reddish violet hydrosulfite vat very pure dark brown shades.

HEINZ SCHEYER.
EMIL SCHWAMBERGER.